(12) United States Patent
Letavic et al.

(10) Patent No.: US 11,536,903 B1
(45) Date of Patent: Dec. 27, 2022

(54) HYBRID EDGE COUPLERS WITH STACKED INVERSE TAPERS

(71) Applicant: GLOBALFOUNDRIES U.S. Inc., Malta, NY (US)

(72) Inventors: Theodore Letavic, Putnam Valley, NY (US); Yusheng Bian, Ballston Lake, NY (US); Kenneth J. Giewont, Hopewell Junction, NY (US); Karen Nummy, Newburgh, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/406,773

(22) Filed: Aug. 19, 2021

(51) Int. Cl.
| | |
|---|---|
| *G02B 6/122* | (2006.01) |
| *G02B 6/30* | (2006.01) |
| *G02B 6/36* | (2006.01) |
| *G02B 6/14* | (2006.01) |
| *G02B 6/124* | (2006.01) |
| *G02B 6/12* | (2006.01) |

(52) U.S. Cl.
CPC .......... *G02B 6/1228* (2013.01); *G02B 6/124* (2013.01); *G02B 6/14* (2013.01); *G02B 6/305* (2013.01); *G02B 6/3636* (2013.01); *G02B 2006/12061* (2013.01)

(58) Field of Classification Search
CPC .... G02B 6/12; G02B 6/12004; G02B 6/1228; G02B 6/125; G02B 6/136; G02B 6/124; G02B 6/14; G02B 6/305; G02B 6/3636; G02B 2006/12061
See application file for complete search history.

(56) References Cited

U.S. PATENT DOCUMENTS

| | | | |
|---|---|---|---|
| 6,316,281 B1 | 11/2001 | Lee et al. | |
| 10,816,726 B1 | 10/2020 | Peng et al. | |
| 2014/0153859 A1* | 6/2014 | Akiyama | G02F 1/025 385/2 |
| 2014/0314370 A1* | 10/2014 | Hatori | G02B 6/4266 385/14 |

(Continued)

OTHER PUBLICATIONS

Sahin et al., "Methods of Forming a V-Groove for a Fiber Optics Cable on an Integrated Photonics Chip", filed Mar. 3, 2020 as U.S. Appl. No. 16/807,811.

(Continued)

*Primary Examiner* — Michael P Mooney
(74) *Attorney, Agent, or Firm* — Thompson Hine LLP; Anthony Canale

(57) ABSTRACT

Structures for an edge coupler and methods of fabricating a structure for an edge coupler. A first waveguide core has a first section that has a tapered shape and a second section that is adjoined to the first section. Multiple segments are positioned with a spaced arrangement adjacent to an end surface of the second section of the first waveguide core. A slab layer is adjoined to the first section of the first waveguide core. A second waveguide core has a section that overlaps with the first section of the first waveguide core to define a layer stack. The section of the second waveguide core has a tapered shape, and the first and second waveguide cores are comprised of different materials. The first section of the first waveguide core has a first thickness, and the slab layer has a second thickness that is less than the first thickness.

20 Claims, 21 Drawing Sheets

(56) References Cited

U.S. PATENT DOCUMENTS

| | | | | |
|---|---|---|---|---|
| 2015/0084092 | A1* | 3/2015 | Fonteneau | H01L 31/1113 257/109 |
| 2017/0139132 | A1* | 5/2017 | Patel | G02B 6/4206 |
| 2018/0172913 | A1* | 6/2018 | Lin | G02B 6/2726 |
| 2018/0224613 | A1* | 8/2018 | Goi | G02B 6/28 |
| 2022/0252790 | A1* | 8/2022 | Dezfulian | G02B 6/136 |

OTHER PUBLICATIONS

Kevin K. Dezfulian et al, "Hybrid Edge Couplers With Layers in Multiple Levels", filed Feb. 8, 2021 as U.S. Appl. No. 17/169,971.

Yusheng Bian, "Edge Couplers With a Partially-Etched Inverse Taper" filed Aug. 5, 2020 as U.S. Appl. No. 16/985,645.

Yusheng Bian, "Edge Couplers With Metamaterial Rib Features" filed Jul. 7, 2021 as U.S. Appl. No. 17/369,253.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

J. V. Galan et al., "CMOS compatible silicon etched V-grooves integrated with a SOI fiber coupling technique for enhancing fiber-to-chip alignment," 2009 6th IEEE International Conference on Group IV Photonics, 2009, pp. 148-150.

B. Peng, et al., "A CMOS Compatible Monolithic Fiber Attach Solution with Reliable Performance and Self-alignment," in Optical Fiber Communication Conference (OFC) 2020, OSA Technical Digest (Optical Society of America, 2020), paper Th3I.4.

R. Takei et al. "Silicon knife-edge taper waveguide for ultralow-loss spot-size converter fabricated by photolithography" Appl. Phys. Lett. 102, 101108 (2013).

B. Snyder et al., "Ultra-broadband, polarization-insensitive SMF-28 fiber edge couplers for silicon photonics," 2017 IEEE CPMT Symposium Japan (ICSJ), 2017, pp. 55-58.

Y. Bian et al., "3D Integrated Laser Attach Technology on 300-mm Monolithic Silicon Photonics Platform," 2020 IEEE Photonics Conference (IPC), 2020, pp. 1-2.

Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper FW5D.2.

M. Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3.

Y. Bian et al., "Hybrid III-V laser integration on a monolithic silicon photonic platform," 2021 Optical Fiber Communications Conference and Exhibition (OFC), 2021, pp. 1-3.

Y. Bian et al., "Monolithically integrated silicon nitride platform," 2021 Optical Fiber Communications Conference and Exhibition (OFC), 2021, pp. 1-3.

* cited by examiner

HYBRID EDGE COUPLERS WITH STACKED INVERSE TAPERS

BACKGROUND

The present invention relates to photonics chips and, more specifically, to structures for an edge coupler and methods of fabricating a structure for an edge coupler.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper located adjacent to the light source. Corresponding to a direction of mode propagation, an inverse taper refers to a tapered section of a waveguide core characterized by a gradual increase in width along the mode propagation direction. In the edge coupler construction, the narrow end of the inverse taper provides a facet that is positioned adjacent to the light source, and the wide end of the inverse taper is connected with another section of the waveguide core that routes the light to the optical components of the photonics chip.

The gradually-varying cross-sectional area of an inverse taper supports mode transformation and mode size variation associated with mode conversion when light is transferred from the light source to the photonics chip. The narrow end at the tip of the inverse taper is unable to fully confine the incident mode received from the light source because the cross-section area of the tip at its narrow end is smaller than the mode size. Consequently, a significant percentage of the electromagnetic field of the incident mode is distributed about the tip of the inverse taper. As its width increases, the inverse taper can support the entire incident mode and confine the electromagnetic field inside the inverse taper.

Conventional edge couplers may exhibit significant insertion loss, as well as exhibit significant back reflection at the facet. Conventional edge couplers may be characterized by a low coupling efficiency because of mismatches in mode shape and mode size with the light source. Conventional edge couplers may also be susceptible to power-related damage because of poor power handling capability, which adversely impacts reliability.

Improved structures for an edge coupler and methods of fabricating a structure for an edge coupler are needed.

SUMMARY

In an embodiment of the invention, a structure for an edge coupler is provided. The structure includes a first waveguide core having a first section that has a tapered shape and a second section that is adjoined to the first section. A plurality of segments are positioned with a spaced arrangement adjacent to an end surface of the second section of the first waveguide core. A slab layer is adjoined to the first section of the first waveguide core. A second waveguide core has a section that overlaps with the first section of the first waveguide core to define a layer stack. The section of the second waveguide core has a tapered shape, and the second waveguide core is comprised of a different material than the first waveguide core. The first section of the first waveguide core has a first thickness, and the slab layer has a second thickness that is less than the first thickness.

In an embodiment of the invention, a method of forming a structure for an edge coupler is provided. The method includes forming a first waveguide core including a first section that has a tapered shape and a second section that is adjoined to the first section, forming a plurality of segments positioned with a spaced arrangement adjacent to an end surface of the second section of the first waveguide core, and forming a slab layer adjoined to the first section of the first waveguide core. The first section of the first waveguide core has a first thickness, and the slab layer has a second thickness that is less than the first thickness. The method further includes forming a second waveguide core having a section that overlaps with the first section of the first waveguide core to define a layer stack. The section of the second waveguide core has a tapered shape, and the second waveguide core is comprised of a different material than the first waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
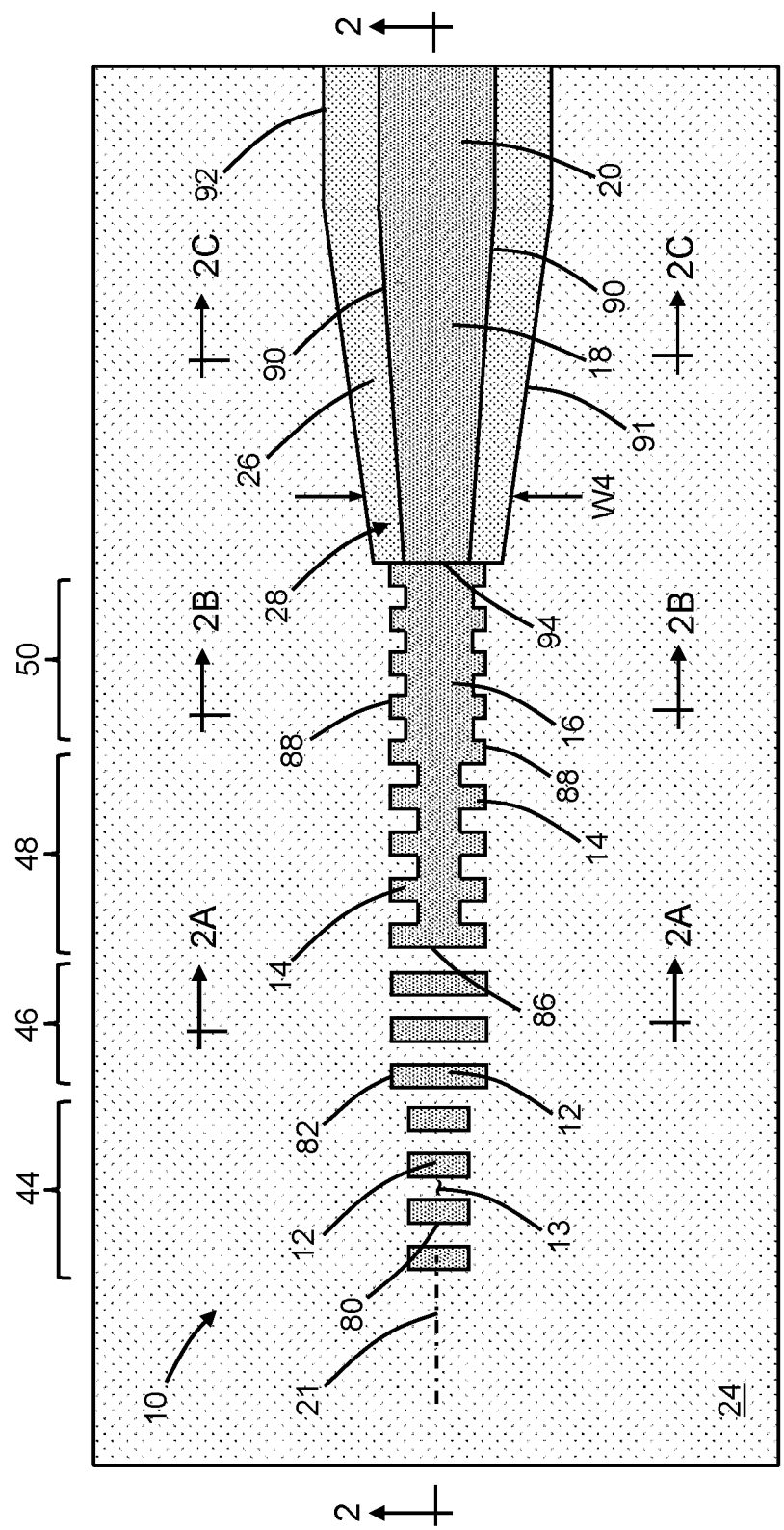
FIG. 1 is a top view of a structure at an initial fabrication stage of a processing method in accordance with embodiments of the invention.
Figure 2:
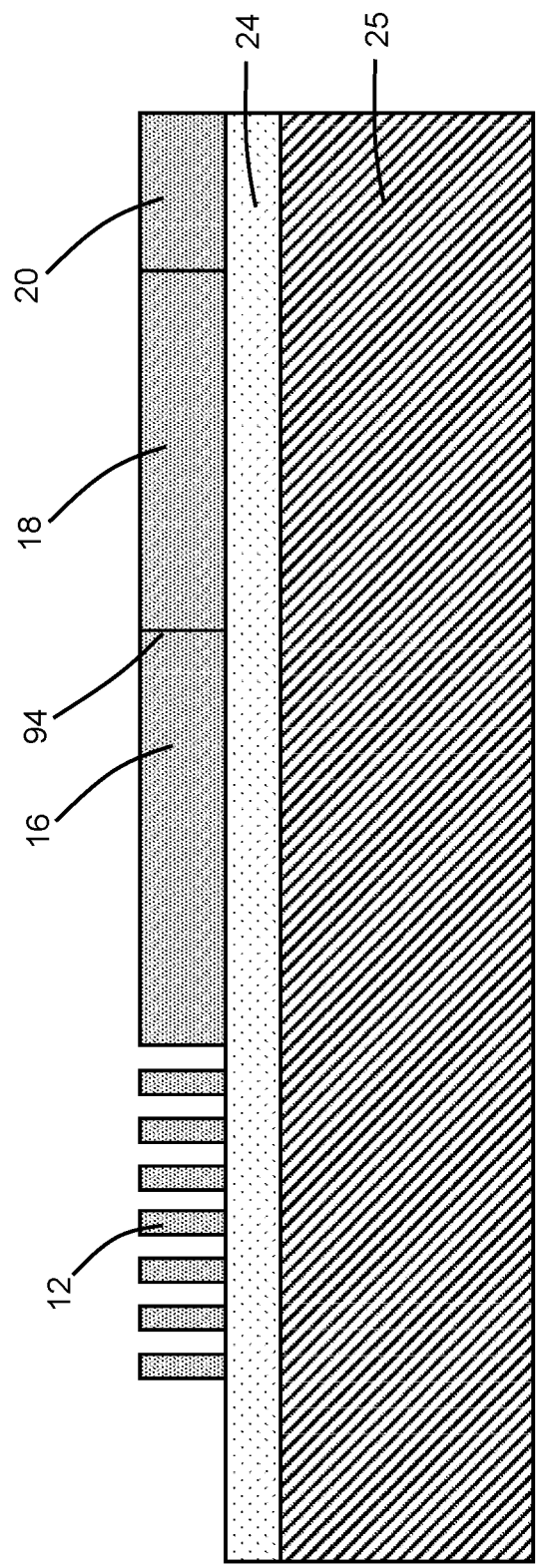
FIG. 2 is a cross-sectional view of the structure taken generally along line 2-2 in FIG. 1.
Figure 2A:
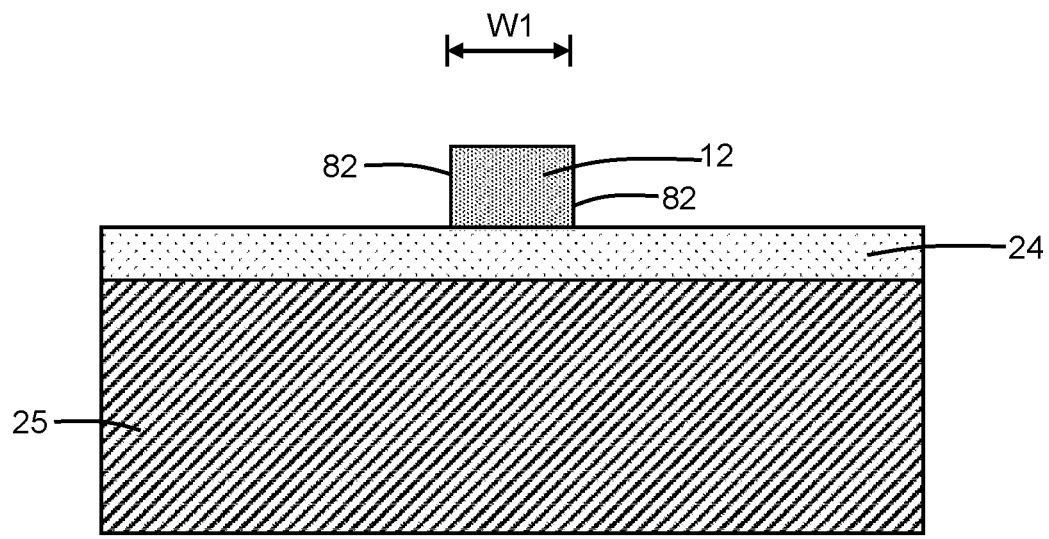
FIG. 2A is a cross-sectional view of the structure taken generally along line 2A-2A in FIG. 1.
Figure 2B:
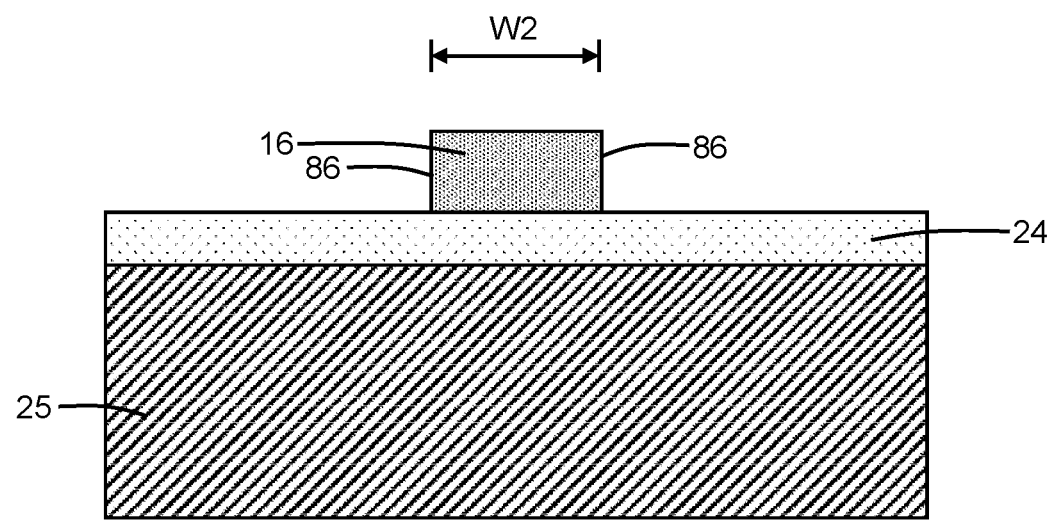
FIG. 2B is a cross-sectional view of the structure taken generally along line 2B-2B in FIG. 1.
Figure 2C:
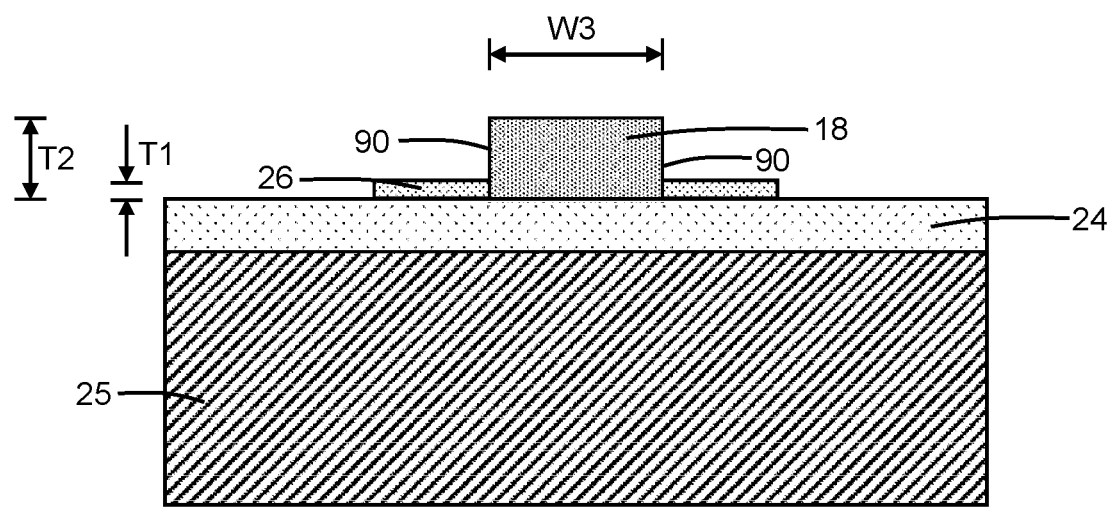
FIG. 2C is a cross-sectional view of the structure taken generally along line 2C-2C in FIG. 1.

With reference to FIGS. 1, 2, 2A, 2B, 2C and in accordance with embodiments of the invention, a structure 10 for an edge coupler includes multiple segments 12 and a waveguide core 28. The waveguide core 28 includes a waveguide core section 16, a waveguide core section 18, and a waveguide core section 20 that are arranged lengthwise along a longitudinal axis 21. The waveguide core section 18 is longitudinally positioned between the waveguide core section 16 and the waveguide core section 20, and the waveguide core section 16 is longitudinally positioned between the segments 12 and the waveguide core section 18. The structure 10 may have a length in a range from two hundred (200) microns to three (3) millimeters.

The segments 12 are located as features in a portion of the structure 10 that initially receives the laser light. Light propagates within the structure 10 in a direction from the segments 12 toward the waveguide core sections 16, 18. The segments 12 constitute discrete pegs that are arranged with a spaced arrangement along the longitudinal axis 21. Adjacent pair of segments 12 are separated by a gap 13. Each segment 12 has opposite sidewalls 80 that border the gaps 13, as well as opposite sidewalls 82 at its side edges.

The waveguide core section 16 is located in a portion of the structure 10 that transfers the light from the segments 12 to the waveguide core sections 18, 20. The waveguide core section 16 includes notched sidewalls 88 and an end surface 86 extending between and connecting the notched sidewalls 88. The waveguide core section 16 is a "fishbone" structure that includes a series of projections 14 as features that are arranged along each of its opposite notched sidewalls 88. In that regard, the opposite notched sidewalls 88 include indentations or grooves defining notches between adjacent pairs of the projections 14. The projections 14 are positioned in respective spaced arrangements along the longitudinal axis 21 and extend outwardly in respective directions that are transverse to the longitudinal axis 21. The segments 12 may be positioned in a row adjacent to the end surface 86, and the end surface 86 may terminate the waveguide core section 16.

The segments 12 may have a width dimension W1 measured between the opposite sidewalls 80, and the waveguide core section 16 may have a width dimension W2 measured between its opposite notched sidewalls 88. The segments 12 may be grouped into a group 44 at an end of the structure 10 that includes the facet and a group 46 that is arranged between the group 44 and the waveguide core section 16. In an embodiment, the width dimension W1 of the segments 12 in the group 46 may be greater than the width dimension W1 of the segments 12 in the group 44. In an embodiment, the width dimension W1 of the segments 12 may range from about 0.07 times to about 0.16 times the wavelength of the light being guided by the segments 12. In an embodiment, the width dimension W2 of the waveguide core section 16 may range from about 0.2 times to about 0.28 times the wavelength of the light being guided by the waveguide core section 16. The light being received by the structure 10 may have a wavelength in a range of, for example, 1260 nm to 1360 nm (the O-band).

In an embodiment, the pitch and duty cycle of the segments 12 may be uniform to define a periodic arrangement. In alternative embodiments, the pitch and/or the duty cycle of the segments 12 may be apodized (i.e., non-uniform) to define a non-periodic arrangement. In an embodiment, the segments 12 may have a rectangular patterned shape. In alternative embodiments, the segments 12 may have a different patterned shape, such as an oval shape or a trapezoidal shape.

The waveguide core section 16 may have a portion 48 that is located adjacent to the segments 12 and a portion 50 that is located adjacent to the waveguide core section 18. The notches between adjacent projections 14 extend laterally inward (i.e., transverse to the longitudinal axis 21) to a greater depth within the portion 48 than within the portion 50. In an embodiment, the pitch and duty cycle of the projections 14 may be uniform to define a periodic arrangement. In alternative embodiments, the pitch and/or the duty cycle of the projections 14 may be apodized (i.e., non-uniform) to define a non-periodic arrangement. In an embodiment, the pitch and duty cycle of the projections 14 may differ from the pitch and duty cycle of the segments 12. In an embodiment, the projections 14 may have a rectangular patterned shape. In alternative embodiments, the projections 14 may have a different patterned shape, such as an oval shape or a trapezoidal shape.

The waveguide core sections 18, 20, which are continuous and unnotched, may have opposite sidewalls 90 and a width dimension W3. The waveguide core section 16 transitions to the waveguide core section 18 at an interface 94. The width dimension W3 of the waveguide core section 18 varies with position (i.e., tapers) along the longitudinal axis 21 and may be considered to inversely taper in a direction of light propagation. In an embodiment, the width dimension W3 of the waveguide core section 18 may increase with increasing distance from the waveguide core section 16. In an embodiment, the width dimension W3 of the waveguide core section 18 may vary over its length based on a linear function to provide a trapezoidal shape. In an alternative embodiment, the width dimension W3 of the waveguide core section 18 may vary over its length based on a non-linear function, such as a quadratic, parabolic, or exponential function. The width dimension W3 of the waveguide core section 20 may be constant with position along the longitudinal axis 21.

The segments 12 and waveguide core 28 may be positioned over a dielectric layer 24. In an embodiment, the dielectric layer 24 may be comprised of silicon dioxide. In an embodiment, the dielectric layer 24 may be a buried oxide layer of a silicon-on-insulator substrate, and the silicon-on-insulator substrate may further include a handle substrate 25 comprised of a semiconductor material (e.g., single-crystal silicon).

The segments 12 and the waveguide core 28 may be comprised of a semiconductor material, such as single-crystal silicon. In an embodiment, the segments 12 and the waveguide core 28 may be concurrently formed by patterning a single-crystal silicon device layer of a silicon-on-insulator substrate with lithography and etching processes. In an embodiment, the segments 12 and the waveguide core 28 may be patterned from the device layer by lithography and etching processes without etching fully through the device layer to initially form an unpatterned slab layer 26 and, subsequently, the slab layer 26 may be patterned to shape with a separate set of lithography and etching processes from the partially-etched portions of the device layer. The dielectric layer 24 may operate as an etch stop when patterning the slab layer 26.

The slab layer 26 is thinner than either of the waveguide core sections 18, 20. In an embodiment, the slab layer 26 has a thickness T1 that is significantly less than the thickness T2 of the waveguide core sections 18, 20. The slab layer 26 is adjoined to lower portions of the waveguide core sections 18, 20 over a height equal to the thickness T1. The slab layer 26 is not adjoined to either the waveguide core section 16 or the segments 12, which have a ridge construction.

The slab layer 26 has a side edge 91 and a side edge 92 opposite from the side edge 91. The waveguide core sections 18, 20 are laterally arranged between, and inwardly spaced from, the side edge 91 and the side edge 92. The slab layer 26 has a width dimension W4 between the side edges 91, 92. In an embodiment, the portion of the slab layer 26 adjoined to the sidewalls 90 of the waveguide core section 18 is tapered such that the width dimension W4 increases with increasing distance from the facet. In an embodiment, the portion of the slab layer 26 adjoined to the sidewalls 90 of the waveguide core section 20 may be non-tapered such that the width dimension W4 is constant.

The waveguide core sections 18, 20 and the slab layer 26 define a rib waveguide structure. Laser light is guided from the rib waveguide structure to other optical components on the photonics chip, such as a modulator or a photodetector. The portion of the rib waveguide structure that includes the waveguide core section 18 and the slab layer 26 may exhibit an improved ability to handle high optical power in comparison with a ridge waveguide structure that lacks a slab layer.

The segments 12 and projections 14 may be positioned at small enough pitch along the longitudinal axis 21 so as not to radiate or reflect light at the wavelength of operation and to act as an effective optical material known as a metamaterial. The segments 12 and projections 14 define metamaterial features in the structure 10. The segments 12 effectively provide a sub-wavelength tapered grating because the size of these features is smaller than the light wavelength. The projections 14 effectively provide another sub-wavelength grating because the size of these features is smaller than the light wavelength.

With reference to FIGS. 3, 4, 4A, 4B, 4C in which like reference numerals refer to like features in FIGS. 1, 2, 2A, 2B, 2C and at a subsequent fabrication stage, a dielectric layer 30 is formed over the segments 12 and the waveguide core 28. The dielectric layer 30 may be comprised of a dielectric material, such as silicon dioxide.

A truncated waveguide core 62 is formed on the dielectric layer 30. The truncated waveguide core 62 has a side surface 64, a side surface 65, an end surface 66 that connects the side surface 64 with the side surface 65, and an end surface 67 opposite to the end surface 66. The truncated waveguide core 62 includes a section 74 that terminates at the end surface 66, a central section 76, and a section 78 that is joined to the section 74 by the section 76. The section 78 may terminate at the end surface 67. In an embodiment, the section 74 may be tapered, the section 78 may be tapered, and the central section 76 may be non-tapered. The sections 74, 76, 78 of the truncated waveguide core 62 may be lengthwise arranged along a longitudinal axis 75.

The truncated waveguide core 62, which is continuous and unsegmented, may have a width dimension W5 that varies with position along the longitudinal axis 75. The section 74 and the section 78 are tapered in opposite directions with the section 74 being inversely tapered with an increasing width dimension W5 in a direction of light propagation and the section 78 being tapered with a decreasing width dimension W5 in the direction of light propagation. In an embodiment, the width dimension W5 of the section 74 may vary over its length based on a linear function to provide a trapezoidal shape. In an alternative embodiment, the width dimension W5 of the section 74 may vary over its lengths based on a non-linear function, such as a quadratic, parabolic, or exponential function. In an embodiment, the width dimension W5 of the section 76 may be constant over its length. In an embodiment, the width dimension W5 of the section 78 may vary over its length based on a linear function to provide a trapezoidal shape. In an alternative embodiment, the width dimension W5 of the section 78 may vary over its length based on a non-linear function, such as a quadratic, parabolic, or exponential function.

The section 74 of the truncated waveguide core 62, which has a length dimension L, overlaps with the waveguide core section 18. In an embodiment, the section 74 of the truncated waveguide core 62 may fully overlap with the waveguide core section 18. In an embodiment, the length dimension L of the section 74 may be substantially equal to a length dimension of the waveguide core section 18. In an embodiment, the end surface 66 of the truncated waveguide core 62 may be arranged over the waveguide core section 18 in the overlapping arrangement. The sections 76, 78 of the truncated waveguide core 62 may overlap with the waveguide core section 20.

The truncated waveguide core 62 is comprised of a different material than the waveguide core 28. In an embodiment, the truncated waveguide core 62 may be comprised of polycrystalline silicon (i.e., polysilicon). In an embodiment, the truncated waveguide core 62 may be fully comprised of polycrystalline silicon. The truncated waveguide core 62 may be formed by depositing a polysilicon layer on the dielectric layer 30 and then patterning the deposited polysilicon layer with lithography and etching processes. The lithography process may form an etch mask comprised of an organic photoresist that is applied on the dielectric layer 30 by a spin coating process, pre-baked, exposed to light projected through a photomask, baked after exposure, and developed with a chemical developer to define a resist shape indicative of the intended patterned shape for the truncated waveguide core 62. The etching process may be an anisotropic etching process, such as reactive ion etching, and the etch mask may be stripped following the etching process.

Polysilicon may be chosen as the material for the truncated waveguide core 62 because polysilicon has the same refractive index as single-crystal silicon forming the waveguide core 28. The polysilicon truncated waveguide core 62 provides the same level of light confinement as the single-crystal silicon waveguide core 28 and allows for efficient mode coupling and transition. In alternative embodiments, the truncated waveguide core 62 may be comprised of silicon nitride, silicon oxynitride, etc.

With reference to FIGS. 5, 5A, 5B, 5C in which like reference numerals refer to like features in FIGS. 4, 4A, 4B, 4C and at a subsequent fabrication stage, one or more dielectric layers 32 are formed over the dielectric layer 30. The one or more dielectric layers 32 may be comprised of silicon dioxide and/or silicon nitride, and may include a conformal layer of silicon nitride that extends across the truncated waveguide core 62.

A back-end-of-line stack 34 is formed over the one or more dielectric layers 32. The back-end-of-line stack 34 may include interlayer dielectric layers 35 and intralayer dielectric layers 36 that alternate in a heterogenous layer stack with the interlayer dielectric layers 35. The interlayer dielectric layers 35 and intralayer dielectric layers 36 are comprised of dielectric materials with different compositions. In an embodiment, the interlayer dielectric layers 35 may be comprised of silicon dioxide and the intralayer dielectric layers 36 may be comprised of silicon-carbon nitride (e.g., nitrogen-doped silicon carbide).

With reference to FIGS. 6, 6A, 6B, 6C in which like reference numerals refer to like features in FIGS. 5, 5A, 5B, 5C and at a subsequent fabrication stage, a portion of the back-end-of-line stack 34 may be removed by lithography and etching processes to expose a portion of the handle substrate 25, and a groove 38 may be formed in the exposed portion of the handle substrate 25 by lithography and etching processes. In an embodiment, the segments 12 and the waveguide core section 16 of the structure 10 may be exposed by the removal of the portion of the back-end-of-line stack 34. In an embodiment, the segments 12 may terminate at the facet of the structure 10, which is defined at least in part by the formation of the groove 38.

A source 22 is placed within the groove 38 adjacent to the facet during an assembly phase. Light, such as laser light, may be directed from the source 22 toward the structure 10. The light may have a given wavelength, intensity, mode shape, and mode size, and the structure 10 may provide spot size conversion for the laser light. In an embodiment, the source 22 may be a semiconductor laser. In an embodiment, the source 22 may be an optical fiber. The gap or space between the source 22 and the structure 10 may be filled by air or an index-matching material, or may include one or more lenses.

The groove 38 may be formed by a multiple-step process culminating in a wet chemical etch characterized by etch rates dependent upon crystalline direction to endow the groove 38 with a V-shape or U-shape. An undercut 40 in the handle substrate 25 may extend laterally from the groove 38 beneath the dielectric layer 24. The undercut 40, which is located beneath a portion of the structure 10, terminates at an edge 41. The undercut 40 may function to minimize substrate-induced leakage loss for the laser light originating from the source 22. The location of the edge 41 may be adjusted such that a portion of the structure 10 is located over the dielectric layer 24. In an embodiment, the edge 41 of the undercut 40 may be positioned such that the waveguide core section 18 is located over the dielectric layer 24, which promotes thermal conduction of heat from the waveguide core section 18 through the dielectric layer 24 for dissipation in the handle substrate 25 and thereby enhances the power handling capability of the structure 10. The positioning of the edge 41 may depend on the mode size of the incoming laser light in terms of the tradeoff between reducing leakage loss to the handle substrate 25 and thermal conduction away from the waveguide core section 18. In an alternative embodiment, the groove 38 may be formed in the handle substrate 25 without forming the undercut 40, which may be appropriate if, for example, the incoming mode of the laser light from the source 22 is small, which maximizes the heat dissipation without compromising leakage loss.

A dielectric layer 42 may be formed over the portion of the structure 10 from which the back-end-of-line stack 34 is removed. In an embodiment, the dielectric layer 42 may be formed over the segments 12 and the waveguide core section 16. The dielectric layer 42 is comprised of a dielectric material, such as silicon dioxide, and lacks the stacked layering of diverse dielectric materials of the interlayer dielectric layers 35 and intralayer dielectric layers 36 in the back-end-of-line stack 34.

The interlayer dielectric layers 35 and intralayer dielectric layers 36 of the back-end-of-line stack 34 transition to the dielectric layer 42 at an interface 43. In an embodiment, the truncated waveguide core 62 may be fully positioned beneath the back-end-of-line stack 34. In an embodiment, the interface 43 may be positioned adjacent to the end surface 66 of the truncated waveguide core 62 and over the waveguide core section 16 in an overlapping arrangement. In an embodiment, the interface 43 may extend diagonally across the waveguide core section 16.

The structure 10, in any of its embodiments described herein, may be integrated into a photonics chip that includes electronic components and additional optical components. For example, the electronic components may include field-effect transistors that are fabricated by CMOS processing.

The structure 10 provides a hybrid edge coupler that includes stacked tapers in the form of the section 74 of the truncated waveguide core 62 and the waveguide core section 18 of the waveguide core 28 in which the stacked tapers are stacked in an overlapping arrangement defining a layer stack containing different materials. The structure 10 may exhibit a significant reduction in the optical return loss and back reflection, as well as mitigate the insertion loss for both polarization modes, proximate to the interface 94 between the waveguide core sections 16, 18 due to the existence of the section 74 of the truncated waveguide core 62 and the presence of the rib waveguide structure provided by the slab layer 26 connected to the waveguide core section 18. The section 74 of the truncated waveguide core 62 and the rib waveguide structure provided by the slab layer 26 connected to the waveguide core section 18 may each function to reduce the optical power guided by the structure 10, which may improve the power handling of the structure 10 and may reduce the susceptibility of the waveguide core sections 16, 18 to optical power-related damage.

Figure 6:
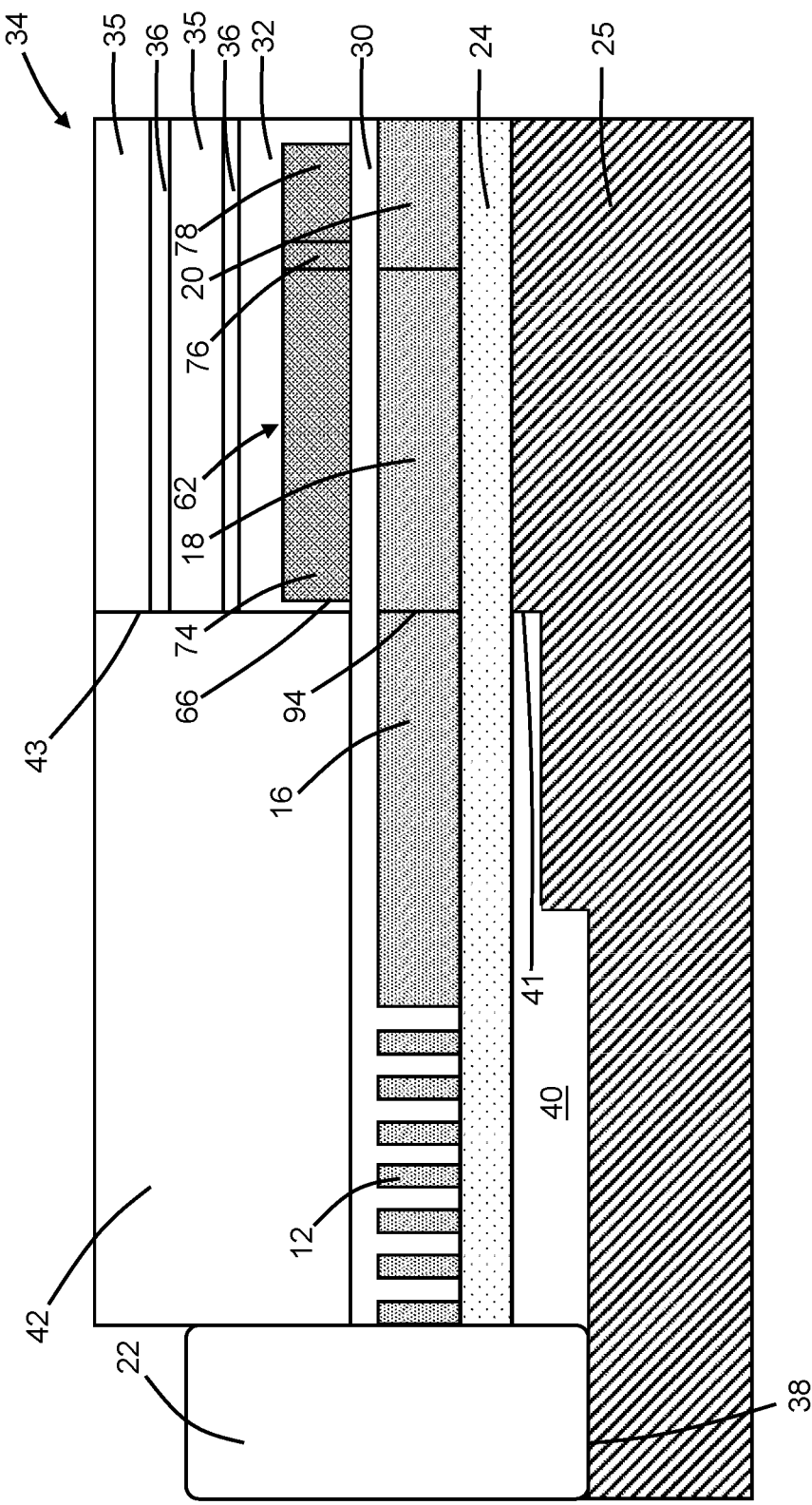
FIGS. 6, 6A, 6B, 6C are cross-sectional views of the structure at a fabrication stage of the processing method subsequent to FIGS. 5, 5A, 5B, 5C.
Figure 6A:
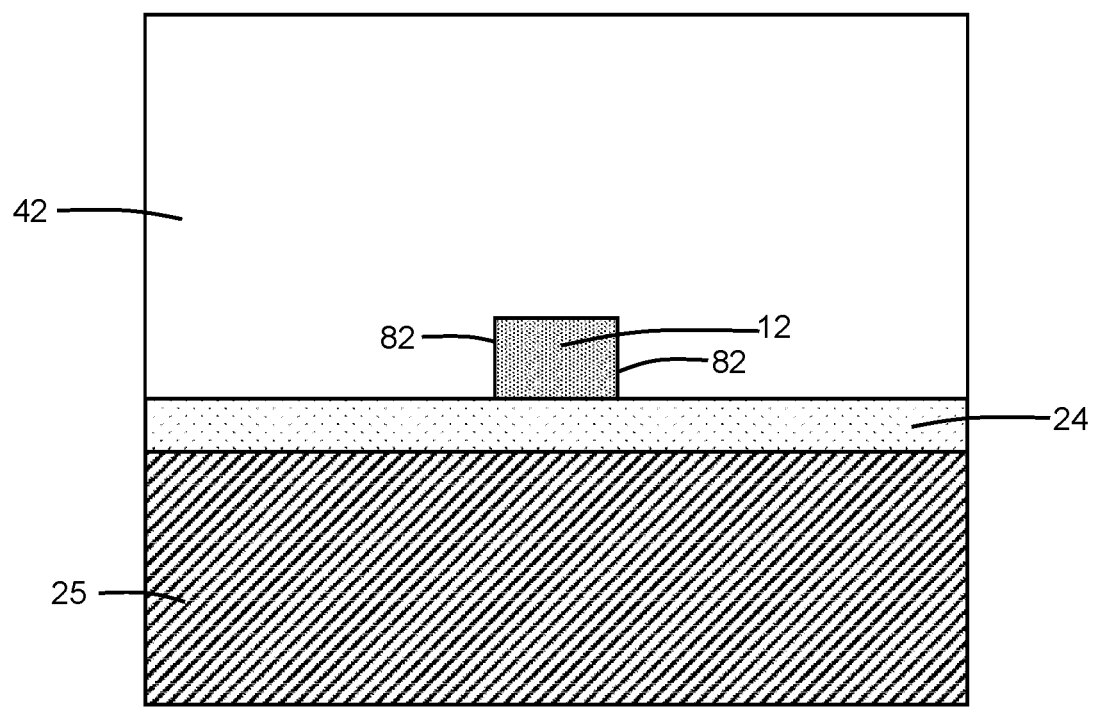
Figure 6B:
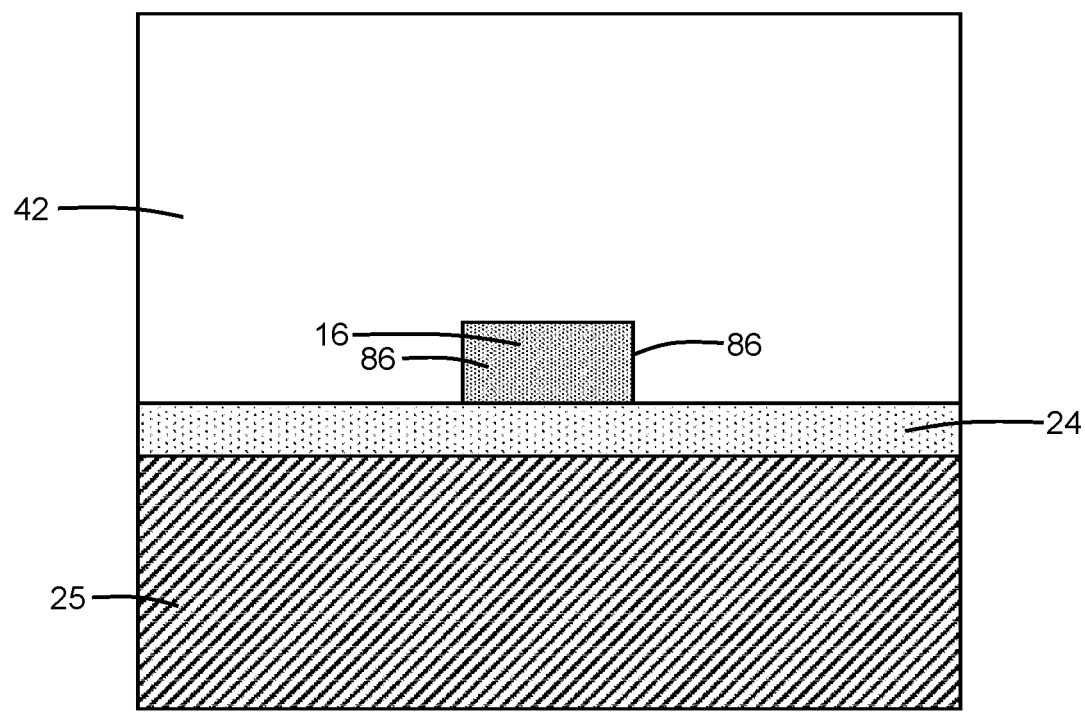
Figure 6C:
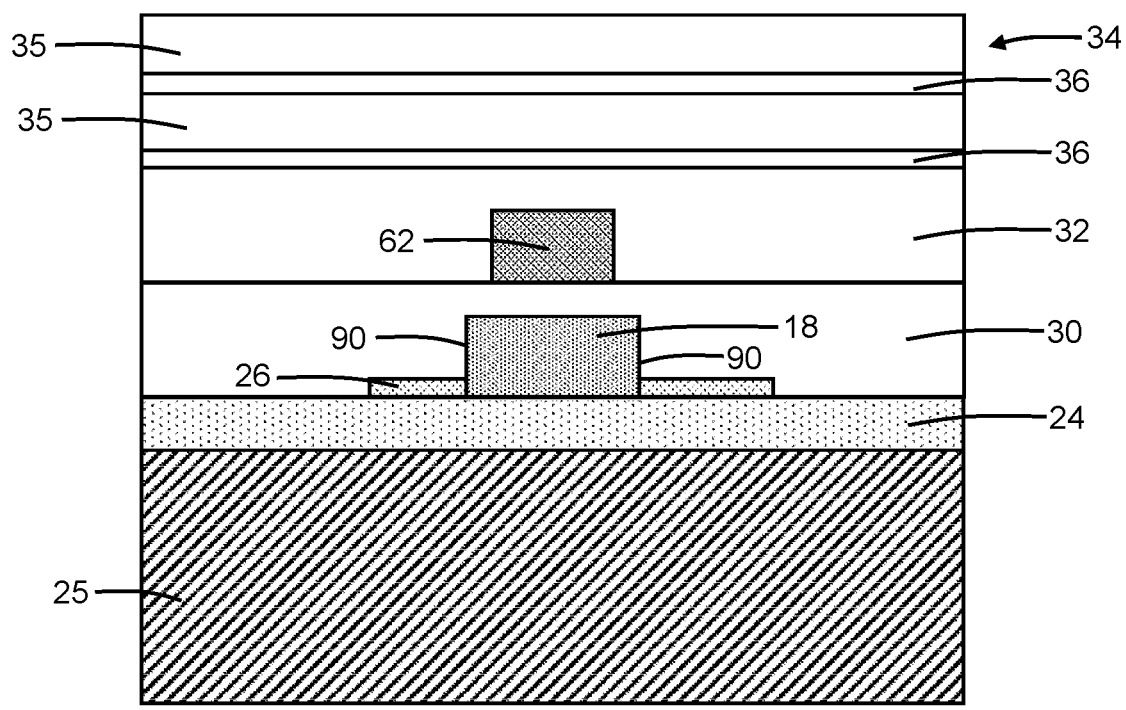
Figure 7:
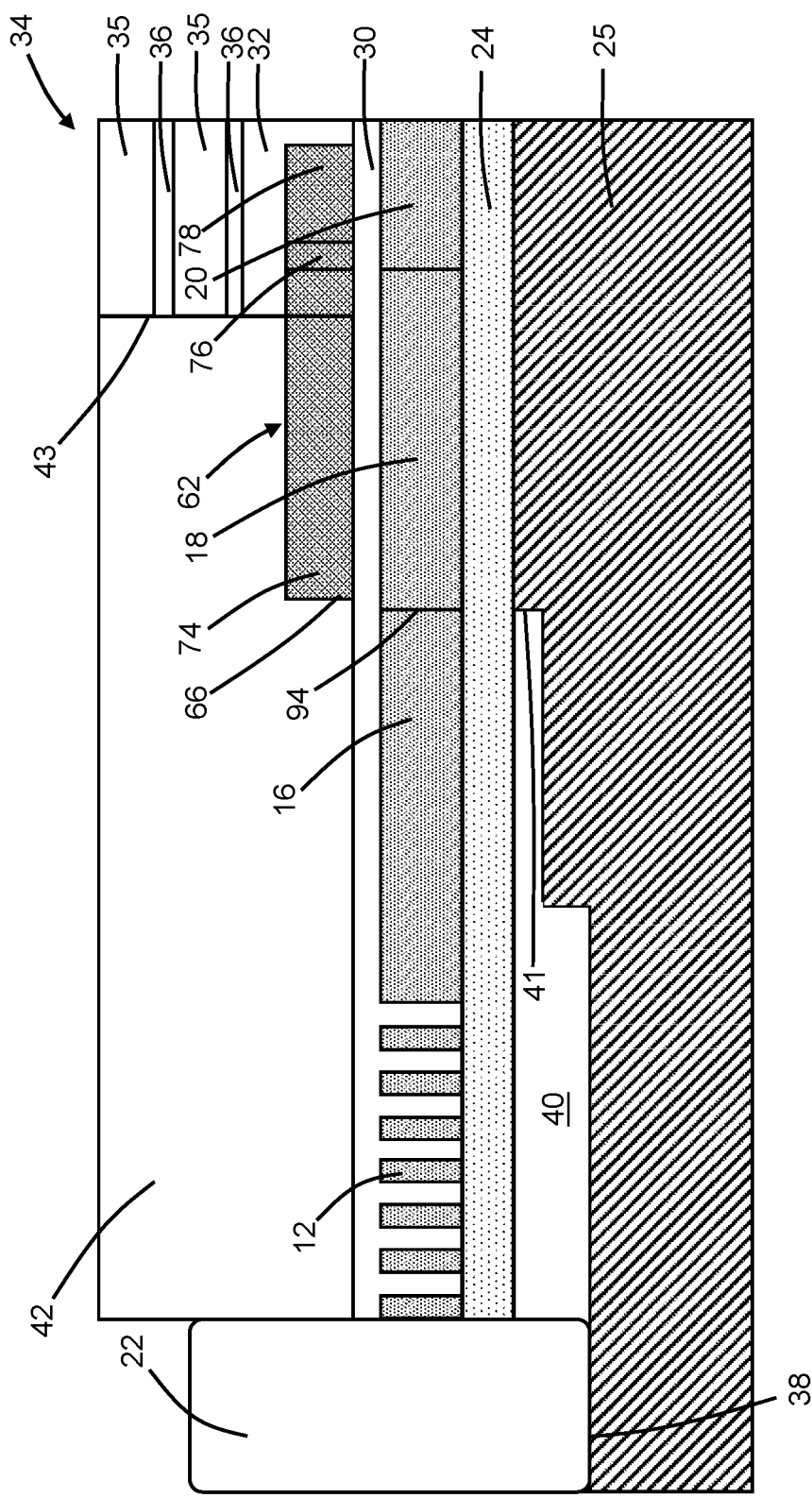
FIG. 7 is a cross-sectional view of a structure in accordance with alternative embodiments of the invention.

With reference to FIG. 7 in which like reference numerals refer to like features in FIG. 6 and in accordance with alternative embodiments of the invention, the interface 43 between the dielectric layer 42 and the back-end-of-line stack 34 may be moved to a position that overlaps with the waveguide core section 18 and that is not adjacent to the end surface 66 of the truncated waveguide core 62. In an embodiment, the end surface 66 of the truncated waveguide core 62 may be arranged over the waveguide core section 16 in the overlapping arrangement. The truncated waveguide core 62 projects past the interface 43 such that the dielectric layer 42 is positioned over a portion of the truncated waveguide core 62 and the back-end-of-line stack 34 is positioned over another portion of the truncated waveguide core 62. The location of the interface 43 may be used to optimize insertion loss and optical return loss optimization, and to reduce the mode interaction with the back-end-of-line stack 34.

Figure 8:
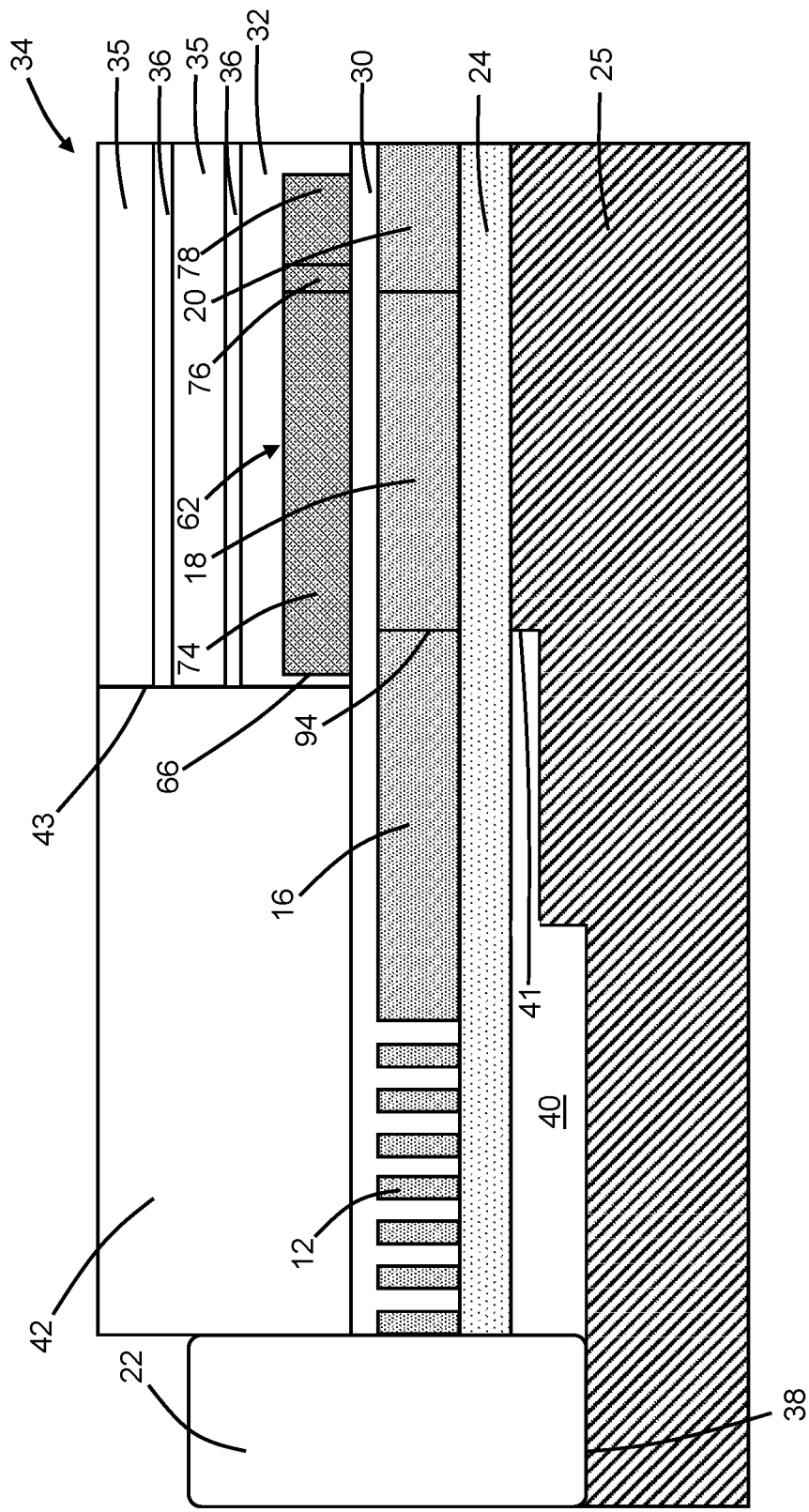
FIG. 8 is a cross-sectional view of a structure in accordance with alternative embodiments of the invention.

With reference to FIG. 8 in which like reference numerals refer to like features in FIG. 6 and in accordance with alternative embodiments of the invention, the section 74 of the truncated waveguide core 62 may be extended in its length dimension L such that the section 74 of the truncated waveguide core 62 also overlaps with a portion of the waveguide core section 16 that is closest to the interface 94 with the waveguide core section 18. In an embodiment, the interface 43 between the dielectric layer 42 and the back-end-of-line stack 34 may be positioned adjacent to the end surface 66 of the truncated waveguide core 62 and over the waveguide core section 16 in an overlapping arrangement. In an embodiment, the interface 43 may extend diagonally across the waveguide core section 16. The length of the truncated waveguide core 62 may be used as a design parameter for the structure in order to optimize insertion loss and optical return loss.

Figure 9:
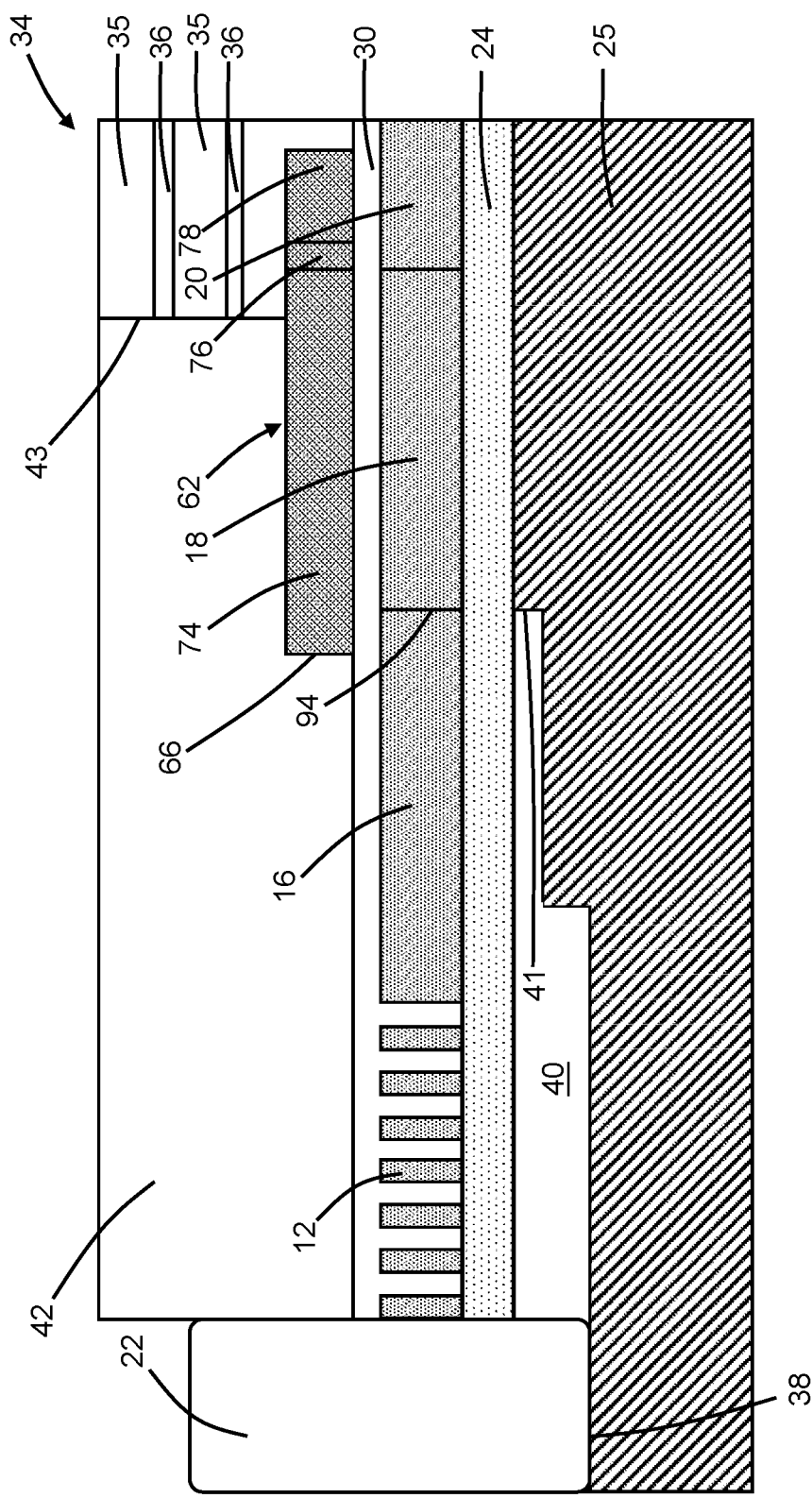
FIG. 9 is a cross-sectional view of a structure in accordance with alternative embodiments of the invention.

With reference to FIG. 9 in which like reference numerals refer to like features in FIG. 8 and in accordance with alternative embodiments of the invention, the interface 43 may be moved to a position that overlaps with the waveguide core section 18 and that is not adjacent to the end surface 66 of the truncated waveguide core 62. The truncated waveguide core 62 projects past the interface 63 and the dielectric layer 42 is positioned over a portion of the truncated waveguide core 62. The back-end-of-line stack 34 is positioned over another portion of the truncated waveguide core 62.

Figure 3:
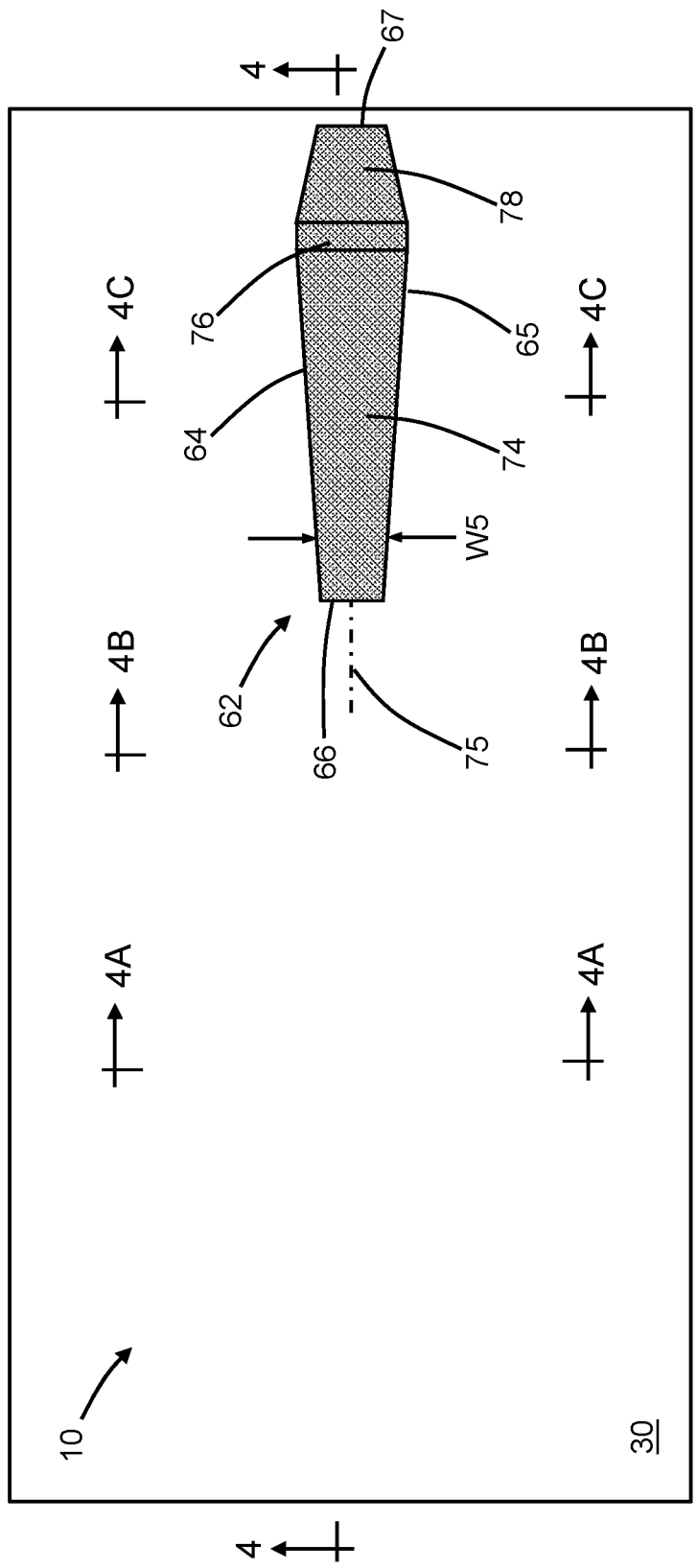
FIG. 3 is a top view of the structure at a fabrication stage of the processing method subsequent to FIG. 1.
Figure 4:
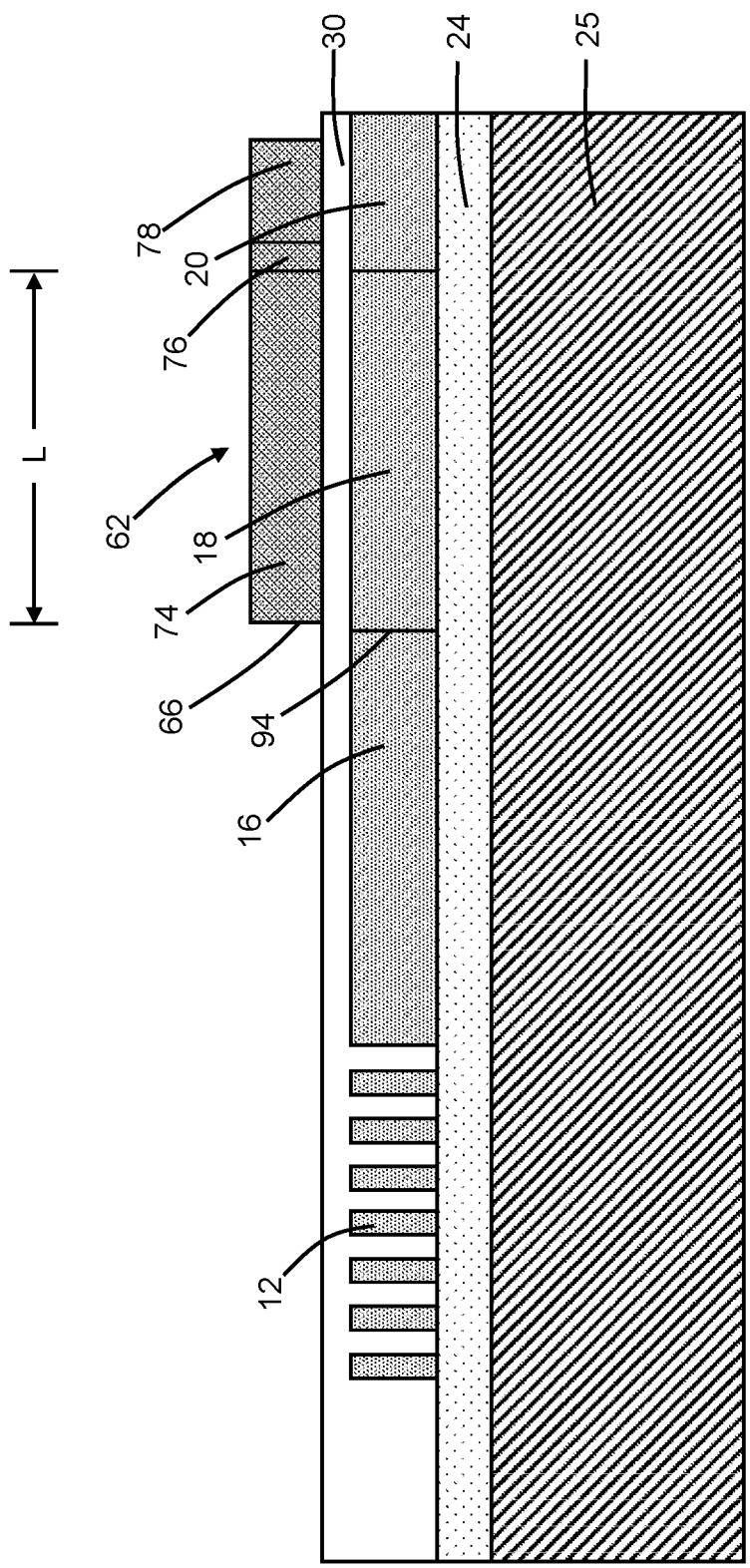
FIG. 4 is a cross-sectional view of the structure taken generally along line 4-4 in FIG. 3.
Figure 4A:
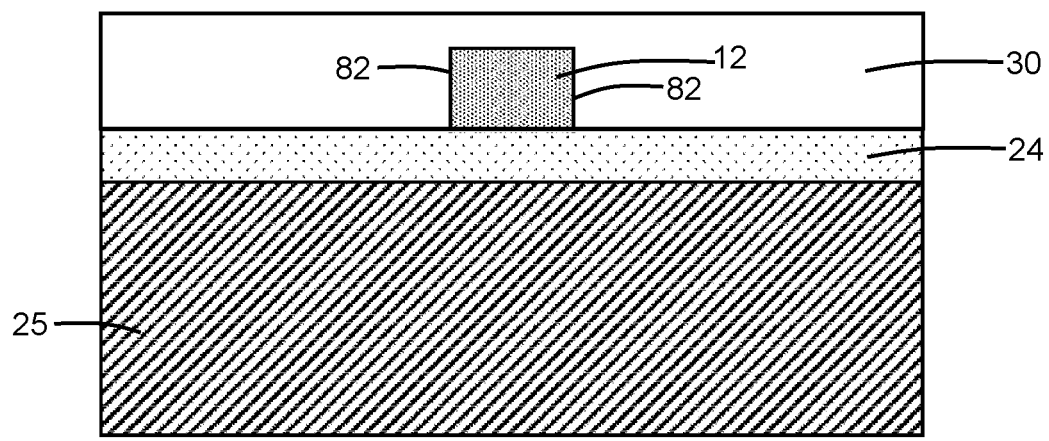
FIG. 4A is a cross-sectional view of the structure taken generally along line 4A-4A in FIG. 3.
Figure 4B:
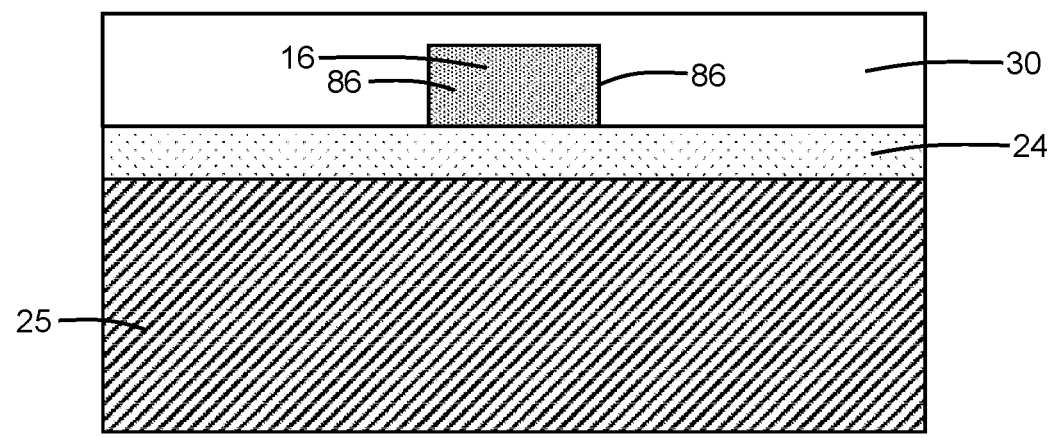
FIG. 4B is a cross-sectional view of the structure taken generally along line 4B-4B in FIG. 3.
Figure 4C:
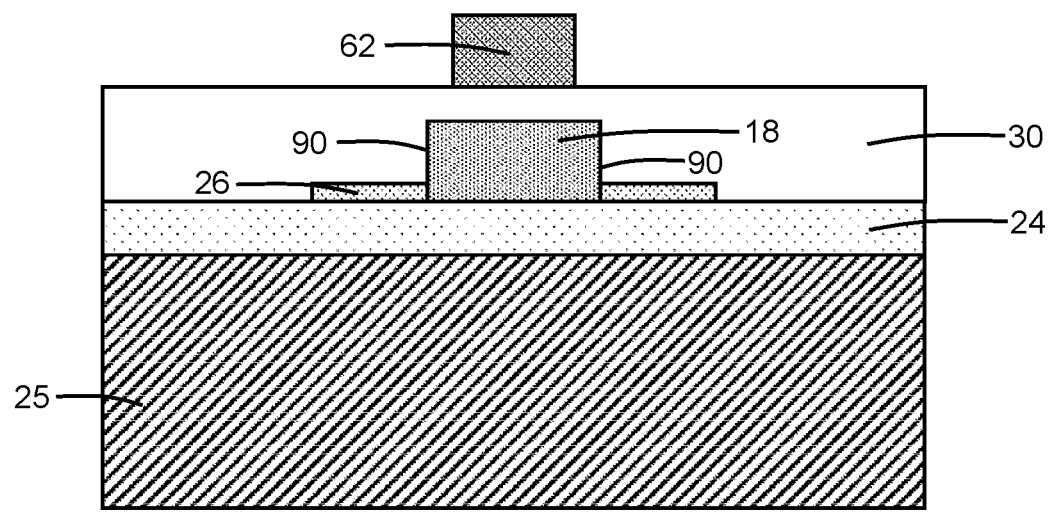
FIG. 4C is a cross-sectional view of the structure taken generally along line 4C-4C in FIG. 3.
Figure 5:
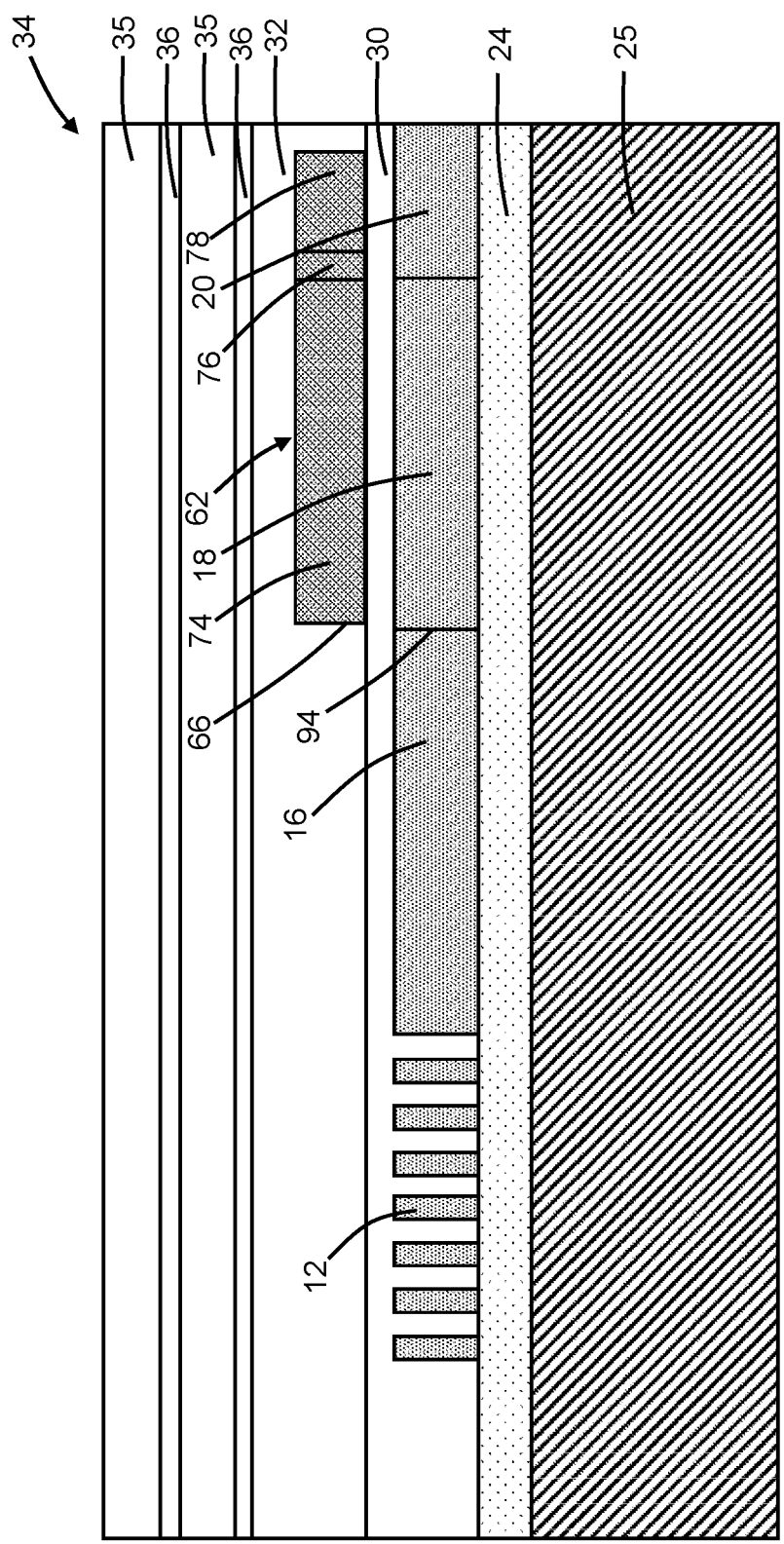
FIGS. 5, 5A, 5B, 5C are cross-sectional views of the structure at a fabrication stage of the processing method subsequent to FIGS. 4, 4A, 4B, 4C.
Figure 5A:
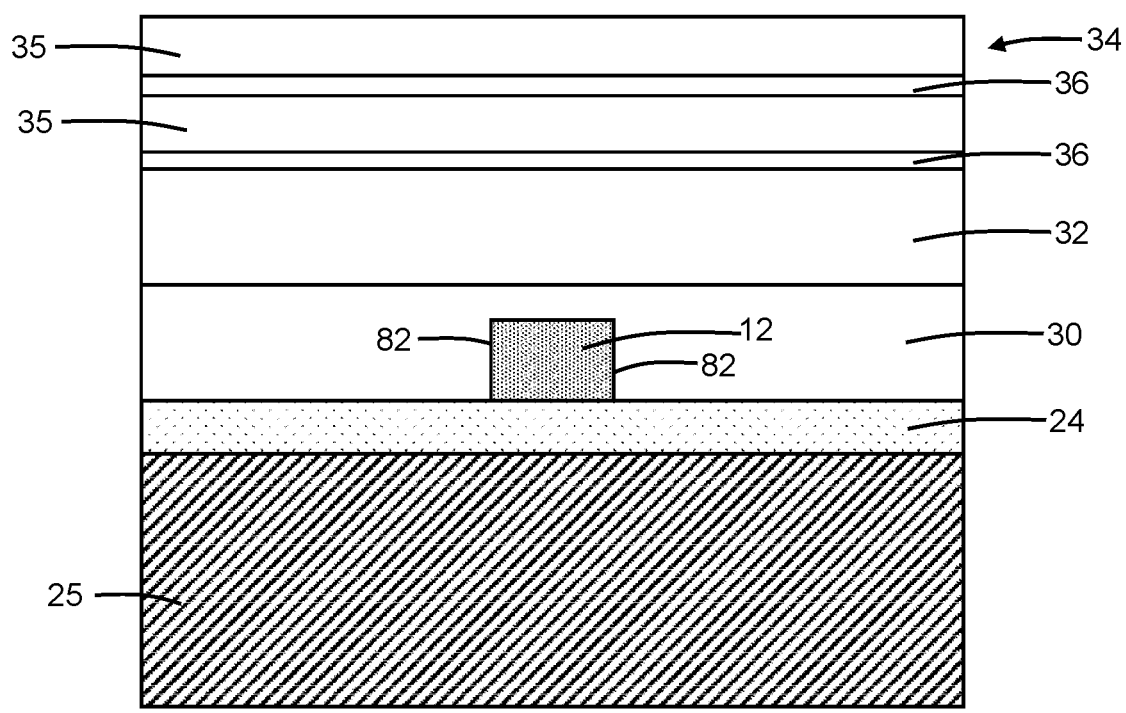
Figure 5B:
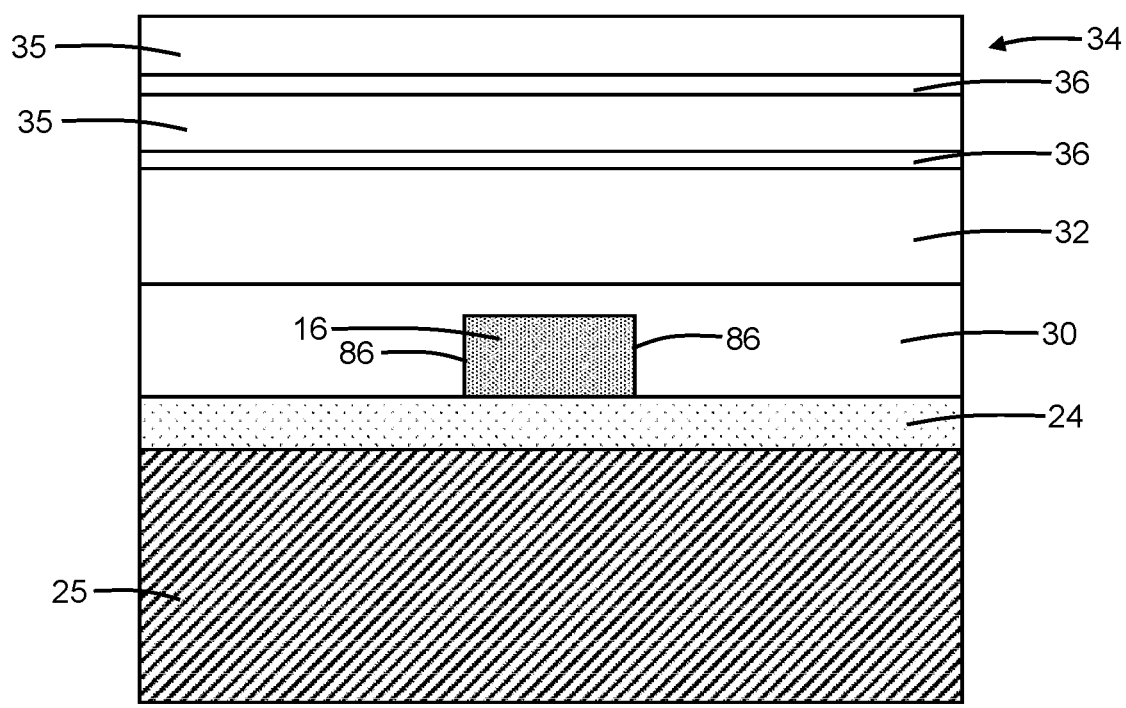
Figure 5C:
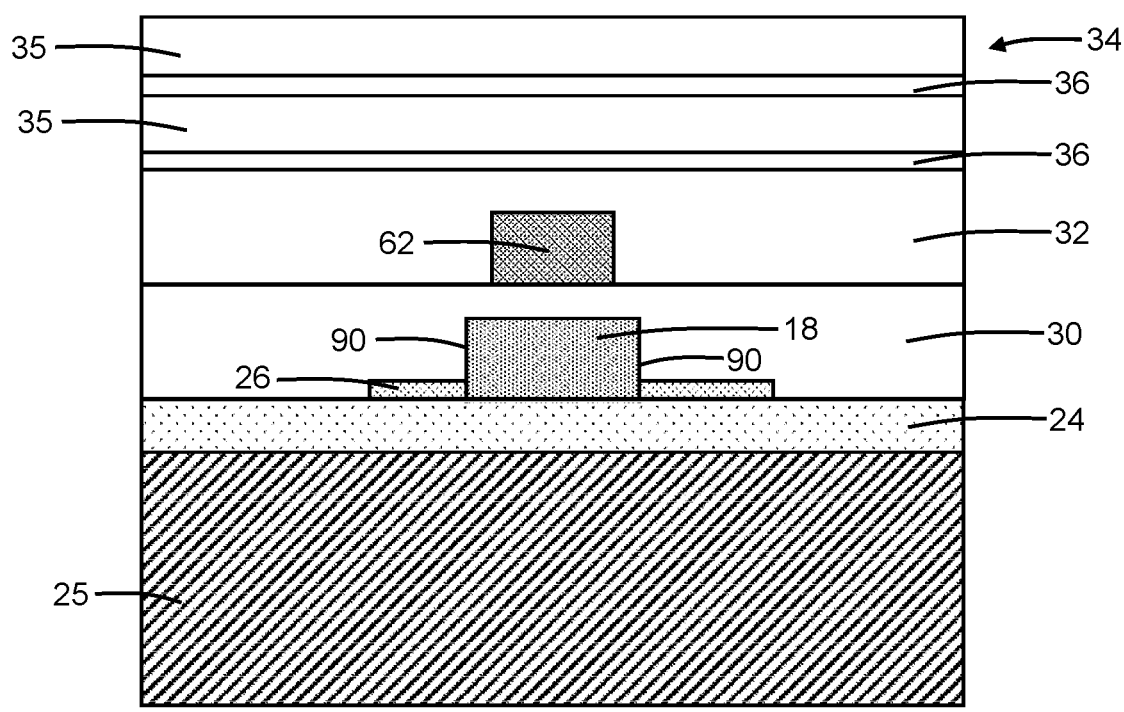
Figure 10:
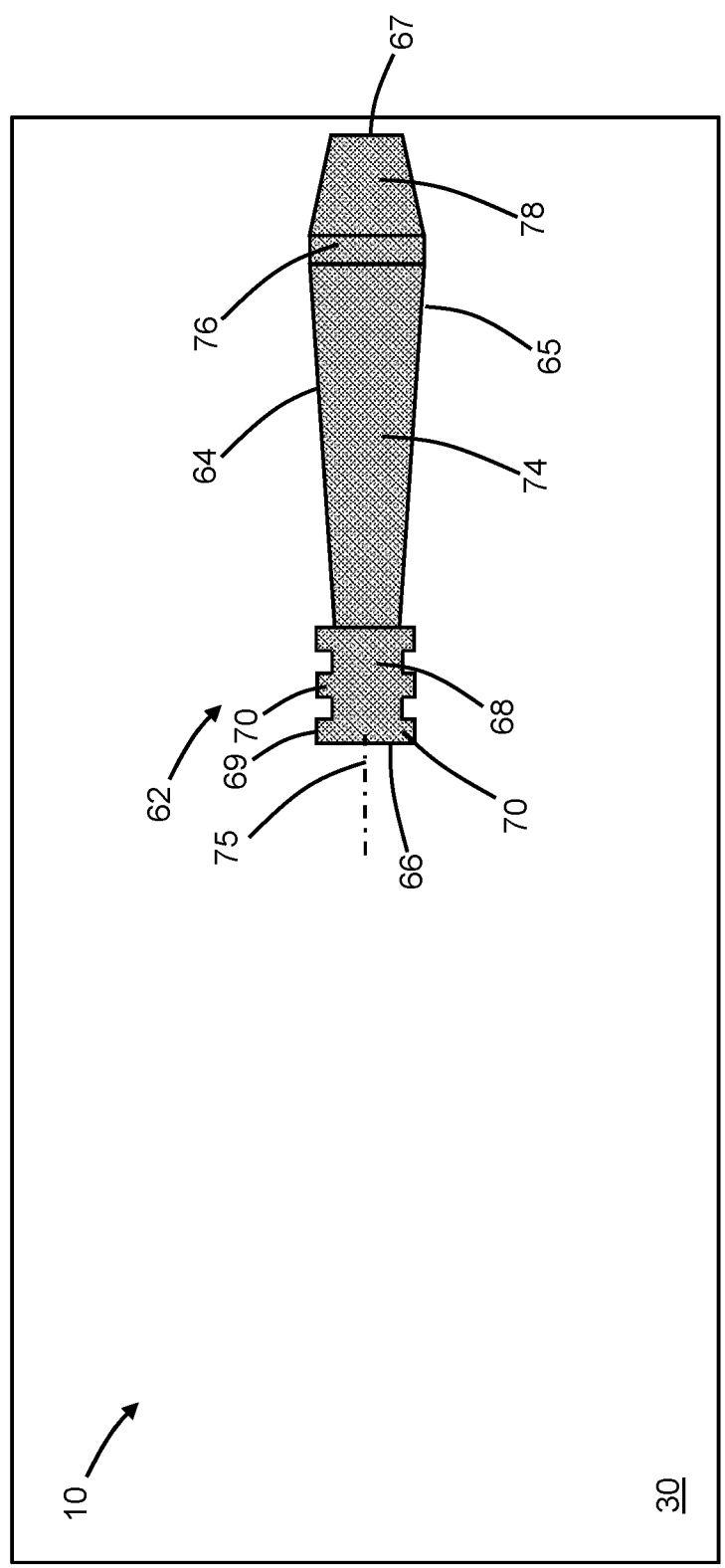
FIG. 10 is a top view of a structure in accordance with alternative embodiments of the invention.

With reference to FIG. 10 in which like reference numerals refer to like features in FIG. 3 and in accordance with alternative embodiments of the invention, the structure 10 may be modified to add a waveguide core section 68 that is adjoined to the section 74 of the truncated waveguide core 62. The waveguide core section 68, which lengthens the truncated waveguide core 62 by its addition, may have notched side surfaces 69 with notches defining indentations or grooves between adjacent pairs of projections 70. An end surface 66 connects the notched side surfaces 69. The projections 70, which are arranged in a spaced arrangement along the longitudinal axis 75, extend outwardly transverse to the longitudinal axis 75. In an embodiment, the waveguide core section 68 may be arranged over, and overlap with, a portion of the waveguide core section 16. Adding the waveguide core section 68 may enable further control over the power density, as well as independent manipulation of the mode properties for transverse electrode and transverse magnetic polarizations.

Processing follows to form the back-end-of-line stack 34, groove 38, and optional undercut 40, as well as the dielectric layer 42 that replaces the removed portion of the back-end-of-line stack 34.

Figure 11:
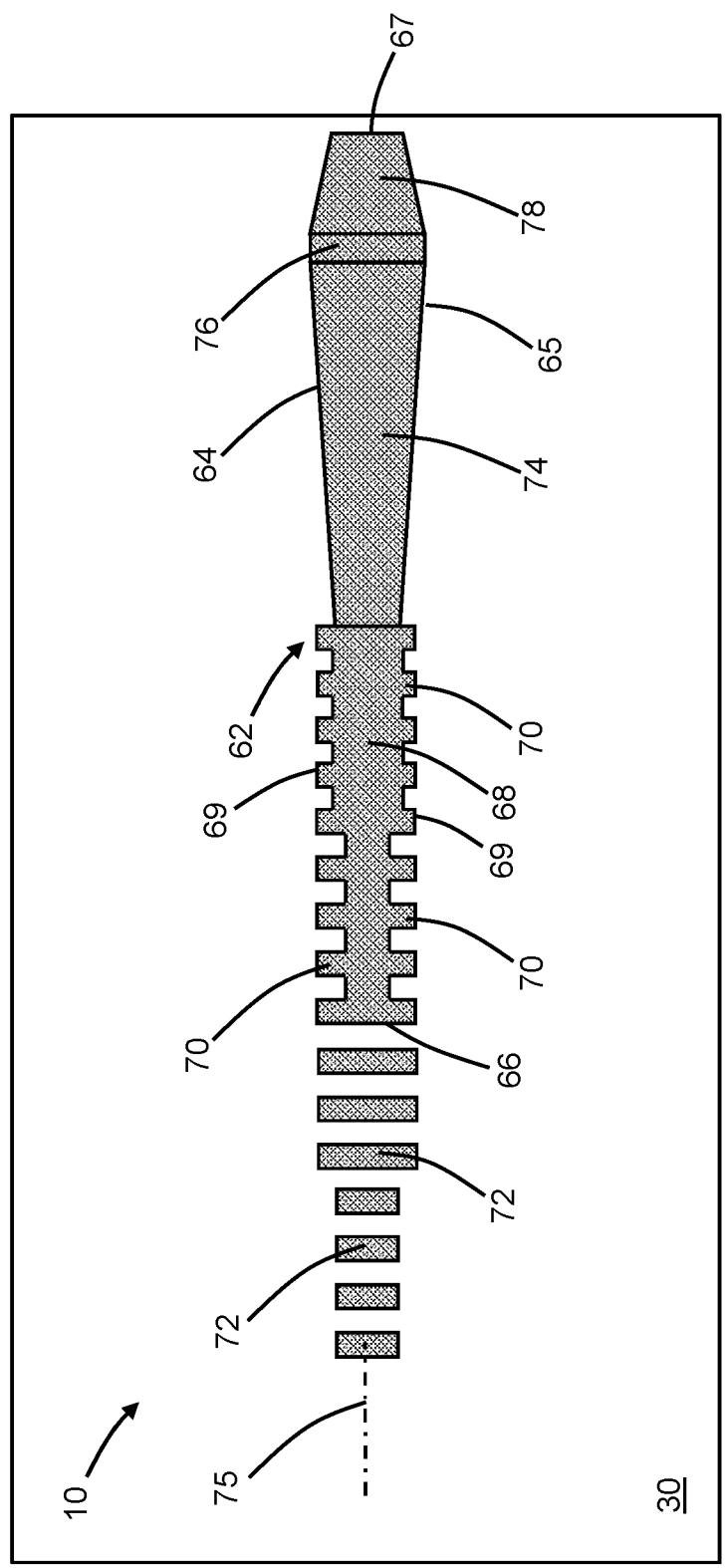
FIG. 11 is a top view of a structure in accordance with alternative embodiments of the invention.

With reference to FIG. 11 in which like reference numerals refer to like features in FIG. 10 and in accordance with alternative embodiments of the invention, the structure 10 may be modified to lengthen the waveguide core section 68 and to add segments 72 positioned adjacent to the end surface 66 of lengthened waveguide core section 68. In an embodiment, the waveguide core section 68 may be arranged over, and fully overlap with, the waveguide core section 16. In an embodiment, the segments 72 may be arranged over, and fully overlap with, the segments 12. Adding the waveguide core section 68 and segments 72 may enable further control of the power density and further provide for independent manipulation of the mode properties for transverse electrode and transverse magnetic polarizations.

Processing follows to form the back-end-of-line stack 34, groove 38, and optional undercut 40, as well as the dielectric layer 42 that replaces the removed portion of the back-end-of-line stack 34.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
   a first waveguide core including a first section that has a tapered shape and a second section that is adjoined to the first section, the second section of the first waveguide core having an end surface;
   a first plurality of segments positioned with a first spaced arrangement adjacent to the end surface of the second section of the first waveguide core;
   a slab layer adjoined to the first section of the first waveguide core; and
   a second waveguide core having a first section that overlaps with the first section of the first waveguide core to define a layer stack, the first section of the second waveguide core having a tapered shape, and the second waveguide core comprised of a different material than the first waveguide core,
   wherein the first section of the first waveguide core has a first thickness, and the slab layer has a second thickness that is less than the first thickness.

2. The structure of claim 1 wherein the slab layer has a first side edge and a second side edge, and the first section of the first waveguide core is laterally positioned between the first side edge and the second side edge.

3. The structure of claim 2 wherein the slab layer is not adjoined to the second section of the first waveguide core.

4. The structure of claim 2 wherein the slab layer is tapered with a first width dimension between the first side edge and the second side edge that increases with increasing distance from the second section of the first waveguide core.

5. The structure of claim 1 wherein the first section of the second waveguide core has an end surface that is positioned over the first section of the first waveguide core.

6. The structure of claim 1 wherein the second waveguide core includes a second section having an end surface, and the end surface is positioned over the second section of the first waveguide core.

7. The structure of claim 1 wherein the second waveguide core includes a second section having an end surface, a first notched sidewall, and a second notched sidewall connected to the first notched sidewall by the end surface, and the second section of the second waveguide core is adjoined to the first section of the second waveguide core.

8. The structure of claim 7 further comprising:
a second plurality of segments positioned with a second spaced arrangement adjacent to the end surface of the second section of the second waveguide core,
wherein the second plurality of segments overlap with the first plurality of segments.

9. The structure of claim 1 wherein the first waveguide core comprises single-crystal silicon, and the second waveguide core comprises polysilicon.

10. The structure of claim 1 further comprising:
a back-end-of-line stack including a plurality of interlayer dielectric layers; and
a dielectric layer adjoining the back-end-of-line stack at an interface, the interface positioned over the second section of the first waveguide core.

11. The structure of claim 10 wherein the first section of the second waveguide core is fully positioned beneath the plurality of interlayer dielectric layers of the back-end-of-line stack.

12. The structure of claim 11 wherein the first section of the second waveguide core has an end surface positioned over the first section of the first waveguide core.

13. The structure of claim 11 wherein the first section of the second waveguide core has an end surface positioned over the second section of the first waveguide core.

14. The structure of claim 1 further comprising:
a back-end-of-line stack including a plurality of interlayer dielectric layers; and
a dielectric layer adjoining the back-end-of-line stack at an interface, the interface positioned over the first section of the first waveguide core.

15. The structure of claim 14 wherein the first section of the second waveguide core includes a first portion positioned beneath the dielectric layer and a second portion positioned beneath the back-end-of-line stack.

16. The structure of claim 15 wherein the first section of the second waveguide core has an end surface positioned over the first section of the first waveguide core.

17. The structure of claim 15 wherein the first section of the second waveguide core has an end surface positioned over the second section of the first waveguide core.

18. A method of forming a structure for an edge coupler, the method comprising:
forming a first waveguide core including a first section that has a tapered shape and a second section that is adjoined to the first section;
forming a plurality of segments positioned with a spaced arrangement adjacent to an end surface of the second section of the first waveguide core;
forming a slab layer adjoined to the first section of the first waveguide core, wherein the first section of the first waveguide core has a first thickness, and the slab layer has a second thickness that is less than the first thickness; and
forming a second waveguide core having a section that overlaps with the first section of the first waveguide core to define a layer stack, wherein the section of the second waveguide core has a tapered shape, and the second waveguide core is comprised of a different material than the first waveguide core.

19. The method of claim 18 wherein the first section of the second waveguide core has an end surface positioned over the first section of the first waveguide core.

20. The method of claim 18 wherein the first section of the second waveguide core has an end surface positioned over the second section of the first waveguide core.

* * * * *